(12) United States Patent
Chan

(10) Patent No.: US 8,736,437 B2
(45) Date of Patent: May 27, 2014

(54) BUILDING EQUIPMENT CONTROL SYSTEM

(75) Inventor: Wing Kee Chan, Kowloon (HK)

(73) Assignee: Nixon Technology Company Limited, Kowloon (HK)

( * ) Notice: Subject to any disclaimer, the term of this patent is extended or adjusted under 35 U.S.C. 154(b) by 198 days.

(21) Appl. No.: 13/206,153

(22) Filed: Aug. 9, 2011

(65) Prior Publication Data
US 2012/0044042 A1 Feb. 23, 2012

(30) Foreign Application Priority Data

Aug. 17, 2010 (HK) .................................. 10107829

(51) Int. Cl.
G08B 29/00 (2006.01)
G08B 21/00 (2006.01)
G09B 23/02 (2006.01)
G05B 15/02 (2006.01)

(52) U.S. Cl.
CPC ........ G05B 15/02 (2013.01); G05B 2219/2642 (2013.01)
USPC ............. 340/506; 340/635; 340/657; 340/3.7

(58) Field of Classification Search
USPC ................... 340/506, 635, 657, 3.7
See application file for complete search history.

(56) References Cited

U.S. PATENT DOCUMENTS

| | | | |
|---|---|---|---|
| 5,295,062 A * | 3/1994 | Fukushima | 700/83 |
| 5,319,698 A * | 6/1994 | Glidewell et al. | 379/39 |
| 6,529,128 B2 * | 3/2003 | Weng | 340/539.1 |
| 6,552,647 B1 * | 4/2003 | Thiessen et al. | 340/3.1 |
| 6,624,750 B1 * | 9/2003 | Marman et al. | 340/506 |
| 7,755,480 B2 * | 7/2010 | Aritsuka et al. | 340/539.22 |
| 7,982,602 B2 * | 7/2011 | Kates | 340/539.22 |
| 8,294,566 B2 * | 10/2012 | Morwood et al. | 340/514 |
| 8,378,808 B1 * | 2/2013 | Gwaltney | 340/506 |
| 2003/0162539 A1 * | 8/2003 | Fiut et al. | 455/424 |
| 2010/0194582 A1 * | 8/2010 | Petite | 340/825.52 |
| 2010/0280836 A1 * | 11/2010 | Lu et al. | 705/1.1 |

* cited by examiner

Primary Examiner — George Bugg
Assistant Examiner — Munear Akki
(74) Attorney, Agent, or Firm — Birch, Stewart, Kolasch & Birch, LLP

(57) ABSTRACT

A building equipment control system comprises a remote transceiver module including a plurality of remote transceivers for remotely receiving multi-channel alarm signals, and each of the remote transceivers including a plurality of input points; a remote indication module including a plurality of remote indicators for performing alarm indication according to the multi-channel alarm signals, and each of the remote indicators including a plurality of output points; a remote main system controller for remotely setting characteristics and authorities of the input and output points; a remote compiler for remotely changing system settings of the remote main system controller and characteristics of the input points. The wiring of the system could save about 70-90% cables and 90-95% junction boxes, and reduce about 70% period of time for wiring and 90% period of time for testing and debugging needed for the conventional building equipment control system. The maintenance costs for the present building equipment control system are very low and thereby the efficiency thereof is higher. It is easier to fix failures of the system.

9 Claims, 2 Drawing Sheets

BUILDING EQUIPMENT CONTROL SYSTEM

CROSS-REFERENCE TO RELATED APPLICATIONS

The application claims the priority benefits of Hong Kong Short-Term Patent Application No. 10107829.0 filed on Aug. 17, 2010. the contents of which are hereby incorporated by reference in its entirety.

FIELD OF THE INVENTION

The present invention relates to the field of electrical control technology, and more particularly to a building equipment control system.

BACKGROUND OF THE INVENTION

With the developments of computer, electronic and communication technologies, the popularity of building automation technology is increasingly widened. To satisfy the requirements for building environments, improve comfort of dwellings and realize scientific management on buildings, building equipment control systems are generally used for controlling end devices, such as lights, air conditioners, etc., to achieve the goal of environment adjustment in accordance with users' desirable standards. Therefore, the scientific management on buildings could be realized.

However, a plenty of multiple-conductor cables and cable boxes should be usually used for wiring of the existing building equipment control systems, which results in complex wirings. The complex wirings may not only raise the costs for manufacture and maintenance of the control systems and increase difficulties in fault remedy, but also deteriorate the reliability of the systems.

SUMMARY OF THE INVENTION

To overcome the above-mentioned defects of the conventional building equipment control system, such as complex wiring, high costs, lower reliability, the present invention aims to provide a novel building equipment control system with simple wiring, lower costs and high reliability.

To achieve the above object, the present invention provides a building equipment control system which may comprise: a remote transceiver module including a plurality of remote transceivers for remotely receiving multi-channel alarm signals, and each of the remote transceivers including a plurality of input points; a remote indication module including a plurality of remote indicators for performing alarm indication according to the multi-channel alarm signals, and each of the remote indicators including a plurality of output points; a remote main system controller for remotely setting characteristics and authorities of the input and output points; and a remote compiler for remotely changing system settings of the remote main system controller and characteristics of the input points.

The building equipment control system of the present invention may further comprise an alarm event printer for printing out the multi-channel alarm signals and status of the system.

In the present building equipment control system, the remote main system controller may be connected to the remote transceiver by virtue of a RS485 communication circuit.

In the present building equipment control system, the RS485 communication circuit includes a lightning arrester.

In the present building equipment control system, the remote transceiver module includes 32 remote transceivers, and each of the remote transceivers includes 32 input points, while the remote indication module includes 32 remote indicators, and each of the remote indicators includes 32 output points.

In the present building equipment control system, the remote compiler is provided with a human-computer interface.

In the present building equipment control system, the remote compiler may set operation time of the alarm event printer.

In the present building equipment control system, the alarm event printer is provided with a non-volatile memory, and contents being printed out by the alarm event printer could be stored in the non-volatile memory at the same time.

In the present building equipment control system, the remote compiler could be connected to the remote main system controller after settings of the remote compiler is set off-line.

The building equipment control system may further comprise a matrix printer connected to the alarm event printer.

The building equipment control system of the present invention is advantageous in that: the remote transceiver module could receive multi-channel alarm signals, and remote indication module could perform alarm indication according to the multi-channel alarm signals. The remote main system controller could remotely set characteristics and authorities of the input and output points, and the remote compiler could change the system settings of the remote main system controller and characteristics of the input points. The wiring of the present system could save about 70-90% cables and about 90-95% junction boxes, and reduce about 70% period of time for wiring and about 90% period of time for testing and debugging needed for the conventional building equipment control system. The maintenance costs for the present building equipment control system are very low and thereby the efficiency thereof is higher. The present building equipment control system is capable of self-diagnosis which makes it easier to fix failures of the system.

BRIEF DESCRIPTION OF THE DRAWINGS

The present invention will be described in detail with reference to the accompanying drawings, in which.

DETAILED DESCRIPTION OF THE INVENTION

Figure 1:
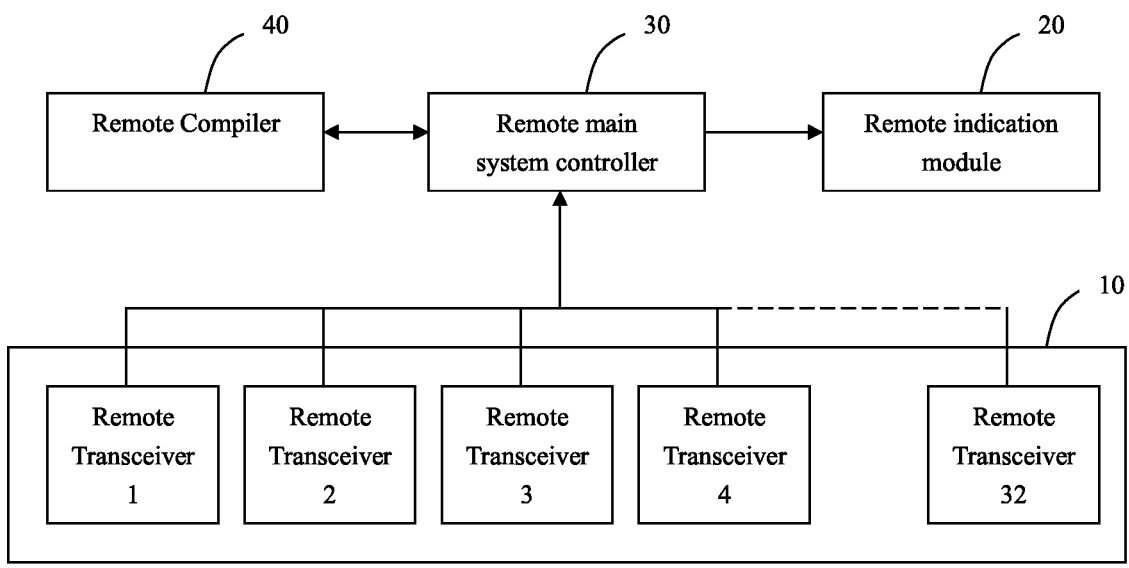
FIG. 1 is a block diagram of a first embodiment of the building equipment control system according to the present invention.

FIG. 1 illustrates a block diagram of a first embodiment of the building equipment control system according to the present invention. The present building equipment control system may comprise a remote transceiver module 10, a remote indication module 20, a remote main system controller 30 and a remote compiler 40, in which the remote transceiver module 10, remote indication module 20 and remote compiler 40 are connected to the remote main system controller 30. The remote transceiver module 10 includes a plurality of remote transceivers for remotely receiving multi-channel alarm signals, while the remote indication module 20 includes a plurality of remote indictors and performs alarm indication according to the multi-channel alarm signals. The remote main system controller 30 is used to remotely set characteristics and authorities of the input and output points. The remote compiler 40 is used to remotely change system settings of the remote main system controller 30 and characteristics of the input points.

Figure 2:
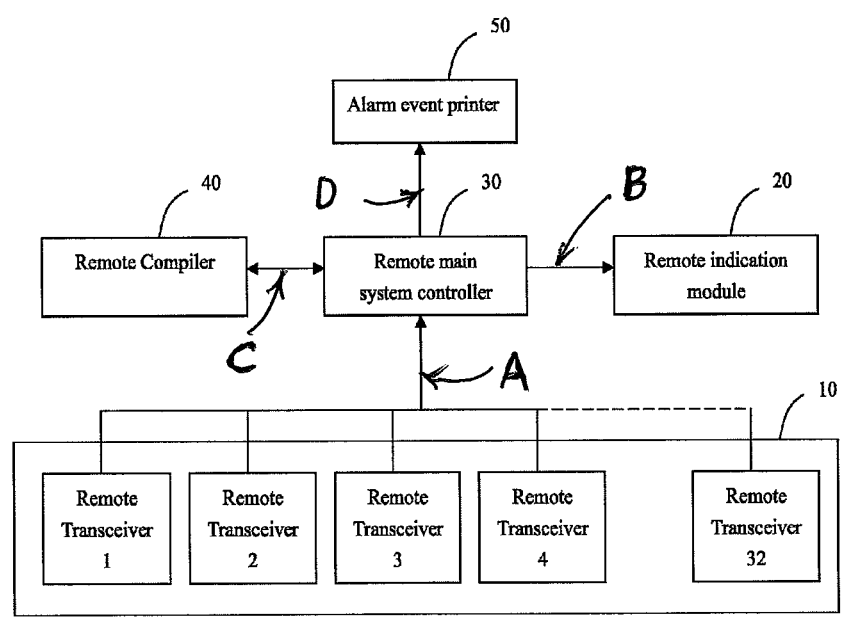
FIG. 2 is a block diagram of a second embodiment of the building equipment control system according to the present invention.

FIG. 2 illustrates a block diagram of a second embodiment of the building equipment control system according to the present invention. The building equipment control system of the present embodiment is different from the first embodiment shown in FIG. 1 in that, on basis of the first embodiment of FIG. 1, the building equipment control system of the second embodiment may further comprise an alarm event printer 50 for printing out the multi-channel alarm signals and system status, which could be recorded as backup documents for review. Such documents could be used as supporting documents for evaluating the performance of the building equipment control system, level of public safety of an estate, etc. As can be seen in FIG. 2, a first communication link A connects the remote transceiver module 10 directly to the remote main system controller 30, a second communication link B connects the remote indication module 20 directly to the remote main system controller 30, a third communication link C connects the remote main system controller 30 directly to the remote compiler 40, and a fourth communication link D connects the remote main system controller 30 directly to the alarm event printer 50.

In the FIGS. 1 and 2, the remote main system controller 30 is connected to the remote transceiver module 10 by virtue of a RS485 communication circuit which includes a lightning arrester for protecting the system from damage of lightning and thus improving the safety of the system. The remote transceiver module 10 could include 32 remote transceivers i.e. remote transceivers 1, 2, 3, 4 . . . 32. Each remote transceiver could include at most 32 input points, which could provide at most 32 channels of alarm inputs for remotely receiving 32 channels of alarm signals, and enable the remote compiler 40 to conveniently change characteristics of each input points, such as normal close/open of alarm, etc. Furthermore, each remote transceiver is of a type of photoelectric isolation and powered separately, which could improve anti-interference capability of the system. In addition, each remote transceiver is a separate element. Thereby, if either remote transceiver needs repairing, it could be removed directly from the system, without switching off the whole system, and thus the operation of the system could not be suspended.

The main function of the remote compiler 40 is to connect to the remote main system controller 30 for changing system settings, such as alarm input/output characteristics. The remote compiler 40 is provided with a numerical keyboard and a liquid crystal display, which could enable to change system settings interactively and conveniently. The remote compiler 40 may pre-set relevant settings off-line, and then be connected to the system. Furthermore, passwords are needed for switching on the remote compiler 40, which could improve the safety of the system.

Each of remote indicators in the remote indication module 20 is associated with a relevant remote transceiver. As the number of the remote transceivers is 32. the number of the remote indicators is also 32. Each remote transceiver could include at most 32output points. In another word, the remote indication module 20 includes could provide at most 1024 output points. Each communication route could connect with maximum 32 remote indicators, each remote indicator could provide 32 output points and each output point could provide a loading of 100 mA/24 VDC.

The remote main system controller 30 is connected with up to 32 remote transceivers, 32 remote indicators, a remote alarm event printer 50 and a remote compiler 40. The remote main system controller 30 may be further extended to enable to be connected to other systems. The remote compiler 40 is provided with a human-computer interface, and could set the setting of the remote main system controller 30, such as number of regions, characteristics of input points, users' passwords, operation timing and date of remote alarm event printer 50.

The start time of the alarm event printer 50 is very short, and the printer could print out all alarm events and system status without being connected to a computer, and store the alarm events at the same time. Furthermore, the alarm event printer 50 could be provided with a non-volatile memory. The contents being printed out by the alarm event printer 50 could be stored in the non-volatile memory at the same time. Therefore, all data could be stored in stable and reliable modules, and thereby could be kept for more than 10 years even if the printer is switched off due to loss of power. In addition, the present building equipment control system may further comprise a matrix printer connected to the alarm event printer 50, which could print out system reports, and could also be used as a backup printer.

The software used in the present building equipment control system could support 32 channels of remote transceiver module 10 and record, store and synchronously print out alarm events. It could also provide two operation modes on basis of maps and lists, and the two operation modes could be switched freely. In addition, the present building equipment control system could quick search, identify and sort the alarm points, and could emit sound and display motion logos in association with the alarm signals, which enables securers to take actions quickly. The present building equipment control system could monitor the connection status of alarm devices in the system, and detect and monitor the operation of the system. In a manner of linkage, the present building equipment control system could trigger alarm devices, realize automation of the system and is capable of self-diagnosis.

In the relevant software of the present building equipment control system, all resources could be managed collectively, and shared according to certain authorities, which enables trans-regional management and control. The software also has a special login interface, and location of numbers could be changed randomly for each login. It could also set several levels of authority to possess perfect authority management function and enhance security of operation of the system. In addition, the present building equipment control system has flexible manners for displaying information, in which the site information of maps could displayed in two modes, i.e. name mode or code mode, and users could switch the two modes freely. The present building equipment control system may further provide detailed record log, and record the control information, status of tasks and system maintenance of all devices. In addition, if some modules in the system break down, it is not necessary to turn off the whole system, since most of buttons and modules of the system are plug-and-play components, which make it easier to replace hardware modules.

In conclusion, the building equipment control system of the present invention is advantageous in that:

1. The present building equipment control system could lower the costs, since it could save about 70-90% cables and 90-95% junction boxes used in conventional building equipment control system.

2. The present building equipment control system could shorten manufacture period, since it could reduce about 70% period of time for wiring and about 90% period of time for testing and debugging needed for the conventional building equipment control system.

3. The maintenance costs for the present building equipment control system are very low and thereby the efficiency thereof is higher. The present building equipment control system is capable of self-diagnosis which makes it easier to fix failures of the system.

Although the description of the present invention is made with reference to the preferred embodiments, the present invention is not limited to these embodiments. Various modifications and changes can be made to the invention by those skilled in the art without departing from the spirit and scopes of the present invention.

What is claimed is:

1. A building equipment control system comprising:
   a remote transceiver module including a plurality of remote transceivers for remotely receiving multi-channel alarm signals, and each of the remote transceivers including a plurality of input and output points;
   a remote indication module including a plurality of remote indicators for performing alarm indication according to the multi-channel alarm signals, and each of the remote indicators including a plurality of output points;
   a remote main system controller for remotely setting characteristics and authorities of the input and output points;
   a remote compiler for remotely changing system settings of the remote main system controller and characteristics of the input and output points of the remote transceivers; and
   an alarm event printer for printing out the multi-channel alarm signals and status of the system; and
   further comprising:
   a first communication link A connecting the remote transceiver module directly to the remote main system controller,
   a second communication link B connecting the remote indication module directly to the remote main system controller,
   a third communication link C connecting the remote main system controller directly to the remote compiler,
   a fourth communication link D connecting the remote main system controller directly to the alarm event printer,
   wherein all communications between the remote transceiver module and the remote indication module passes only through each of the first communication link A, the remote main system controller, and the second communication link B,
   all communications between the remote transceiver module and the remote compiler passes through only the first communication link A, the remote main system controller, and the third communication link C, and
   the fourth communication link D directly connects the alarm event printer only to the remote main system controller, thereby enabling the alarm event printer to receive printing instructions only from the remote main system controller.

2. The building equipment control system according to claim 1, wherein the remote main system controller is connected to the remote transceiver module by virtue of a RS485 communication circuit.

3. The building equipment control system according to claim 2, wherein the RS485 communication circuit includes a lightning arrester.

4. The building equipment control system according to claim 2, wherein the remote transceiver module includes 32 of the remote transceivers, and each of the remote transceivers includes 32 of the input points, while the remote indication module includes 32 of the remote indicators, and each of the remote indicators includes 32 of the output points.

5. The building equipment control system according to claim 1, wherein the remote compiler is provided with a human-computer interface.

6. The building equipment control system according to claim 1, wherein the remote compiler sets operation timing of the alarm event printer.

7. The building equipment control system according to claim 1, wherein the alarm event printer is provided with a non-volatile memory and contents being printed out by the alarm event printer could be stored in the non-volatile memory at the same time.

8. The building equipment control system according to claim 1, wherein the remote compiler could be connected to the remote main system controller after settings of the remote compiler is set off-line.

9. The building equipment control system according to claim 1, further comprising a matrix printer connected to the alarm event printer.

* * * * *